March 17, 1970  F. HOM ET AL  3,500,644
THRUST REVERSER
Filed April 10, 1968  3 Sheets-Sheet 1

INVENTORS
F. HOM
G. E. MEDAWAR
BY
*George E. Pearson*
ATTORNEY

March 17, 1970 — F. HOM ET AL — 3,500,644
THRUST REVERSER
Filed April 10, 1968 — 3 Sheets-Sheet 2

INVENTORS
F. HOM
G. E. MEDAWAR
BY
*George E. Pearson*
ATTORNEY

March 17, 1970  F. HOM ET AL  3,500,644
THRUST REVERSER

Filed April 10, 1968  3 Sheets-Sheet 3

INVENTORS
F. HOM
G. E. MEDAWAR
BY
George E. Pearson
ATTORNEY

United States Patent Office 3,500,644
Patented Mar. 17, 1970

3,500,644
THRUST REVERSER
Felix Hom, La Mesa, and George E. Medawar, San Diego, Calif., assignors to Rohr Corporation, Chula Vista, Calif., a corporation of California
Filed Apr. 10, 1968, Ser. No. 720,031
Int. Cl. F02k 1/00, 3/02; B64c 15/04
U.S. Cl. 60—229                    7 Claims

ABSTRACT OF THE DISCLOSURE

A thrust reverser arrangement for a fan type jet propulsion engine includes a fixed ring of flow reversing cascades which are uncovered when the aft portion of a split cowl for the engine fan is translated rearwardly to an extended position. During the translational movement of the aft portion, peripherally disposed blocker doors which are pivotally secured to the cascades are rotated into position to block the fan air and force the same through the cascades. Rotary actuators actuators carried by the forward cowl portion have threaded shafts which drive threaded members secured to the aft cowl portion to translate the same. The ends of the threaded shafts act through right angle drives and flexible shafts to operate power hinges for rotating the doors. Additional right angle drives operated by the threaded shafts are operatively connected together to synchronize the rotary actuators.

BACKGROUND OF THE INVENTION

This invention relates generally to thrust reversers for bypass fan type jet propulsion engines and more particularly to improvements therein.

Various thrust reversers of this type have heretofore been provided in which a translatable fan cowl portion is moved to expose a ring of flow reversing cascades to which the normal fluid flow through the bypass duct is diverted by a plurality of blocker doors or flaps which have been rotated into position to block the bypass duct. While such prior art reversers have been generally suitable for the purposes intended, they have had several structural and functional limitations imposed by the specific structure and combination of parts employed to accomplish the reverser function without compromising any of the aerodynamic characteristics, performance, and functions desired of the engine. For example, it has been considered desirable to provide a reverser capable of interfitting with the aircraft structure as it exists to effect other aerodynamic functions while also being capable of supplying thrust modulation characteristics to provide for immediate and full thrust during a landing operation while also maintaining the engine at its full rotating speed and without changing loading on the fan or gas generator. It further has been considered important that the reverser have a fail-safe characteristic enabling it to retain a specific position, that is, in the event of structural failure, that it will stay in reverse thrust position while being used as a landing roll reverser, or to return to a fully stowed position while being used for thrust modulation in a cruise condition.

SUMMARY OF THE INVENTION

In accordance with the present invention, the thrust reverser hereinafter disclosed and claimed is adapted particularly for use with a jet propulsion powerplant of the front fan bypass type having an engine and a fan concentric therewith and extended radially beyond the wall of the engine. A cowl surrounds the fan and is spaced from the engine wall to provide a bypass duct therewith. The cowl is split into fore and aft cylindrical portions which form inner and outer flow surfaces when closed in cruise position.

A plurality of peripherally disposed rotary actuators are secured to the forward cowl portion and have drive shaft members which extend longitudinally into the aft cowl portion. Threadedly engaged support elements on the drive shaft members are secured to the aft cowl portion for translation support of the same on the shafts to an extended position rearwardly of the forward cowl portion to thus develop an annular opening therebetween. A ring of flow reversing cascades secured to the forward cowl portion is disposed within the region of this opening, and the cascades become fully exposed when the aft cowl portion is telescopically moved thereover into its extended position. The ring of cascades have longitudinal channels through which the support elements move translationally along the drive shaft members which extend to the end ring of the cascade structure where the shafts conveniently are journalled.

A plurality of peripherally disposed blocker flaps or doors are pivotally secured by power hinges to the cascade end ring, and the doors form a part of the inner flow surface of the aft cowl portion when in its cruise position. A first system of right angle drives and flexible shafts operatively connect the actuator drive shaft members together at their upstream ends thereby to synchronize the operation of the actuators. A second system of right angle drives connect the terminal end portions of the drive shaft members, and these right angle drives have flexible shaft connections with the power hinges to cause the doors to be synchronously rotated into position to block the bypass duct as the aft cowl portion moves translationally to its extended position. The doors in their extended rotated position engage the engine wall to block the bypass duct and force the normal flow of bypass air to pass through the flow reversing cascades to thus produce the desired reverse thrust. The actuator drives will retain the parts in their moved positions, and in the event of structural failure, a fail-safe operating condition is provided in that the fan air forces on the blocker doors will retain or move the same into blocking position.

OBJECTS

An object of the present invention is to provide a new and improved thrust reverser arrangement for bypass type turbojet engines which retains all of the advantages of prior art reversers.

Another object is to provide a reverser arrangement of this type which may be employed effectively with existing fan engine structures without compromising any of the aerodynamic characteristics desired for other functions of the engine.

Another object is to provide such a reverser arrangement in which the flow reversing cascades are opened and the blocker doors are closed in a manner to cause only a minimum of interference with the normal operation of the engine during thrust modulation of the reverser.

Another object is to provide such a reverser arrangement in which the translational and rotational movements of the aft cowl portion and blocker doors is effected by simple actuating means which also serve to support these members for their respective movements thereby minimizing the number of elements required for the purpose.

Yet another object is to provide such a reverser arrangement in which the cascades may be covered, or alternatively exposed, by a translatable member without requiring translational movement of the blocker doors.

Still another object is to provide a thrust reverser arrangement of the aforedescribed type which is effective in the event of a structural failure to assume a fail-safe osition in which the reverser retains its deployed or thrust reversing position.

Still other features, advantages and objects of the present invention are inherent in or to be implied from the novel construction, combination and arrangement of the parts constituting a preferred embodiment of the invention as will become more fully apparent as the description proceeds.

THE SPECIFICATION

Figure 1:
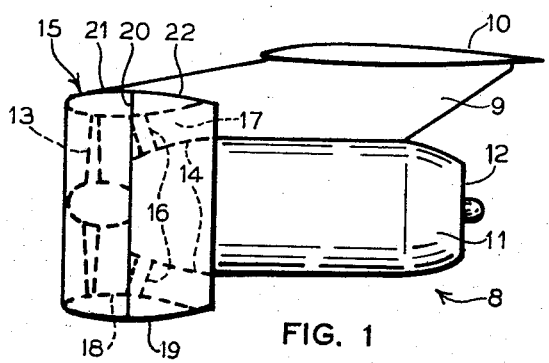
FIG. 1 is a view in elevation of a fan type jet propulsion powerplant supported from an aircraft wing and employing the thrust reverser of the present invention.

Referring now to the drawings for a more complete understanding of the invention, and first more particularly to FIG. 1, a fan type engine generally designated 8 is shown supported by a pylon 9 from an aircraft wing 10. Fan type engine 8 comprises a jet engine 11 which discharges a gaseous effluent through nozzle 12 to provide thrust. In this case, the gas jet thrust is augmented by air flow produced by a fan 13 driven by the engine and disposed concentric with the engine 11 and extended radially beyond the wall 14 thereof. A cowling generally designated 15 is spaced from and supported by suitable struts 16 extended from the engine wall 14 to form a bypass duct 17 for flow of the fan air therebetween.

Figure 2:
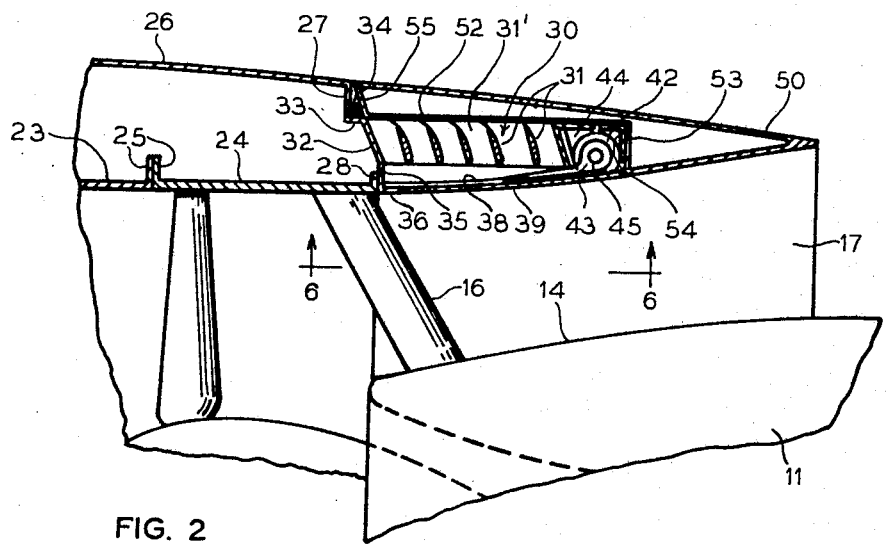
FIG. 2 is an enlarged cross-sectional view of the thrust reverser in its cruise position and taken in the region of a power hinge.
Figure 3:
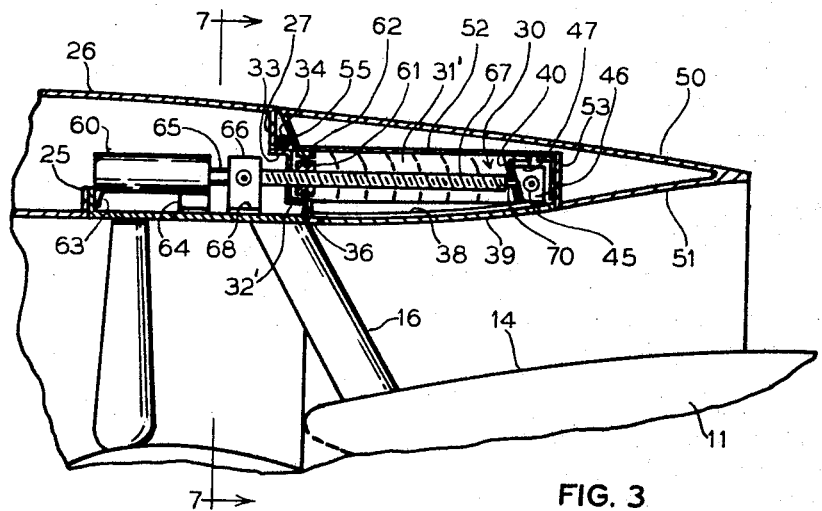
FIG. 3 is a view similar to FIG. 2 taken in the region of a rotary actuator.

For purposes of the present invention, and in order to provide a simple, light weight structure for reversing the fan air flow through the bypass duct 17 without compromising the physical characteristics of the engine geometry while also providing a minimum cowling thickness between its inner and outer flow surfaces 18 and 19, respectively, the cowling 15 is used as part of the reverser structure and, to this end, is split along the peripheral line 20 to form a forward cowl portion 21 and an aft cowl portion 22, both portions of which form inner and outer flow surfaces 18 and 19 in the cruise position of the thrust reverser as shown in FIGS. 2 and 3.

Referring now to FIGS. 2 to 8, the forward cowl portion 21 comprises inner cowl panels 23 and 24 which are suitably joined as by their outwardly directed and engaging flanges depicted at 25, panel 24 being suitably joined to strut 16. Forward cowl portion 21 also comprises an outer cowl panel 26 which terminates at its downstream end in an inwardly directed flange 27 which is disposed opposite the outwardly directed terminal flange 28 of inner cowl panel 24.

Figure 6:
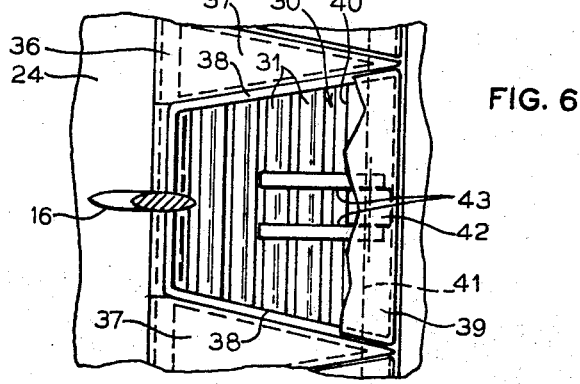
FIG. 6 is a fragmentary view as seen along the line 6—6 of FIG. 2 of the door seat arrangement, the doors being removed.

A ring 30 of flow reversing cascades 31 is secured to the forward cowl portion 21, having for this purpose an upstream end ring 32 with a forwardly directed flange 33 which connects with panel flange 27 in any suitable manner and forms therewith a seat for a sealing ring 34. End ring 32 also has an inwardly directed portion 35 which makes a suitable connection with panel flange 28 and a rearwardly directed portion 36 which supports and is suitably connected to a plurality of peripherally spaced wedge shaped island members 37, FIG. 6. Members 37 have side flanges 38 which provide seats for a plurality of peripherally spaced doors 39 which, when in their cruise position of FIGS. 2 and 3, are nested between the island wedge members and thus provide a smooth inner flow surface through the aft cowl portion 22. Wedge members 37 are suitably secured at their downstream ends to the downstream end ring 40 of cascade ring 30, as best seen in FIG. 6.

Figure 8:
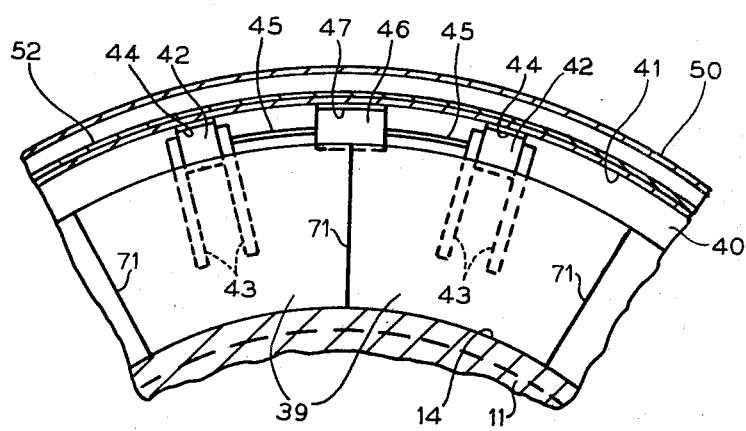
FIG. 8 is a fragmentary sectional view of the door and power hinge arrangement as viewed along the line 8—8 of FIG. 4.

Cascade ring 40 has a flange 41 which supports a plurality of peripherally spaced power hinges 42, there being one for each door 39, as best seen in FIG. 8. Each hinge 42 comprises a pair of outer hinge arms 43 which rotate in unison about the hinge axis and serve to fasten its associated door to the hinge by any suitable means, and each hinge also comprises a central hinge arm 44, FIGS. 2, 4 and 8, which also rotates about the hinge axis and serves to fasten the hinge by any suitable means to flange 41 of the cascade end ring 40.

Power hinges 42 may be of any type suitable for the purpose such, for example, as the "Power Hinge" manufactured by the Curtiss Wright Corporation, Dayton, Ohio, Drawing No. 174,643. The operation of such hinges is well known. It suffices to state herein that the hinge arm members 43 and 44 are coupled internally by gearing having an input drive disposed coaxially of the hinge. As disclosed in FIG. 8, the input drive to each hinge 42 is a flexible shaft 45 which, in turn, is driven by a right angle drive 46, there being one drive 46 for each pair of adjacently disposed power hinges 42. Each drive 46 is suitably secured as by a bracket 47 to flange 41 of cascade end ring 40.

Aft cowl portion 22 comprises an outer cowl panel section 50 which together with panel 26 of forward cowl portions 21 forms the outer cowling surface 19, FIG. 1, when cowl portion 22 is in its cruise position. Cowl portion 22 also comprises an inner cowl panel section 51 which together with doors 39 and their associated island members 37, and cowl panels 23 and 24 of the forward cowl portion constitute the inner flow surface 18, FIG. 1, of the cowling when the aft portion 22 is in its cruise position. Aft portion 22 further comprises a longitudinal panel section 52 which is joined at its downstream end to inner panel section 51 by a ring section 53 and structurally strengthened thereat by an angular ring member 54, and joined at its upstream end to outer panel section 50 by an inclined ring member 55 which moves to engage ring 34 in sealing engagement therewith when the aft cowl portion is moved into its cruise position, as shown in FIGS. 2 and 3.

Figure 4:
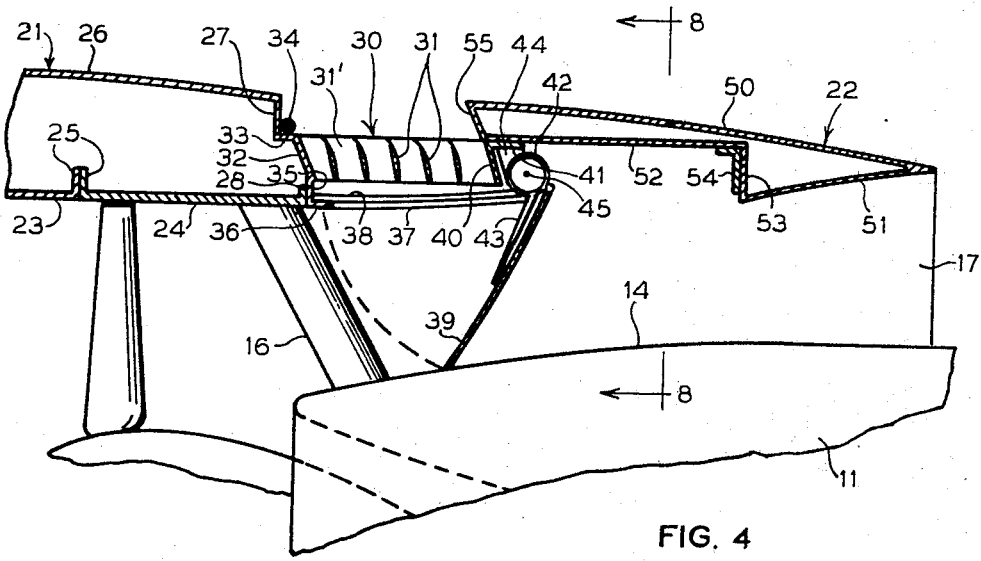
FIG. 4 is a view similar to FIG. 2 and showing the reverser in its reverse thrust position.
Figure 5:
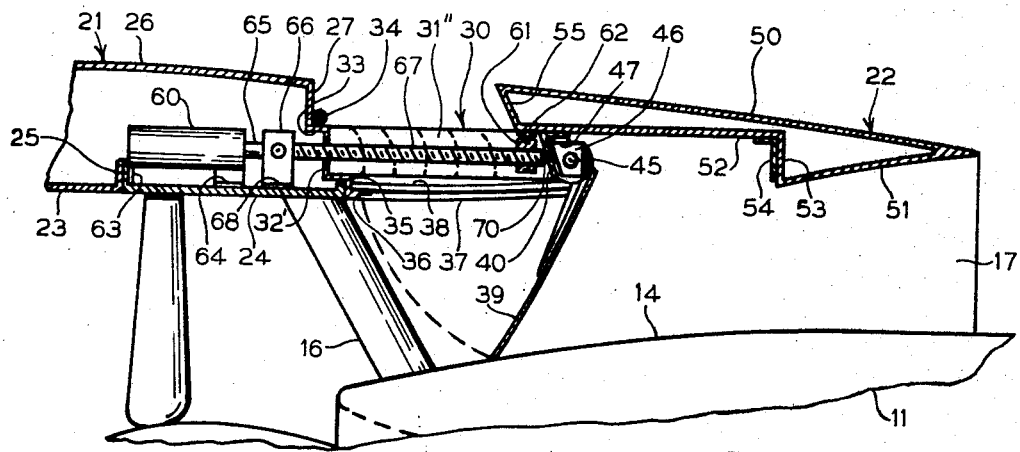
FIG. 5 is a view similar to FIG. 3 and showing the reverser in its reverse thrust position.

Longitudinal panel section 52 extends parallel to the outer surface of cascade ring 30 and moves telescopically over the flow reversing cascades 31 as the aft cowl is moved between its stowed position of FIGS. 2 and 3 and its deployed position of FIGS. 4 and 5, thereby to cover or expose the cascades, as the case may be. Aft cowl portion 22 is a unitary structure; panel and ring sections 50, 51, 52 and 53 and 55, for example, as shown, constituting a single annular member of tubular cross section, strengthened as aforenoted by the angle ring member 54, and having a plurality of peripherally spaced nut type drive members 61 suitably secured, as depicted at 62, to the upstream end of longitudinal panel section 52.

The nut drive members 61 respectively are parts of a plurality of rotary actuators 60, each of which is mounted as by fore and aft supports 63 and 64 to the inner cowl panel 24 of the forward cowl portion 21. Each actuator has a drive shaft 65 which, at its upstream end portion, first passes through a right angle drive 66, and then has a threaded portion 67 which passes freely through an opening provided therefor in upstream cascade end ring 32, the associated nut 61 being threadedly engaged on shaft portion 67 and translatable therealong as the shaft is rotated. As seen in FIGS. 3 and 5, the upstream cascade end ring is shaped in the region of nut members 61 to accommodate the same, as depicted at 32'. Also, as seen in FIGS. 2 to 5, nut members 61 and their drive shafts pass between adjacently disposed cascade channel members 31' and 31" which support the cascades in a well-known manner; these channel members extending for this purpose between the cascade end rings 32 and 40.

Figure 7:
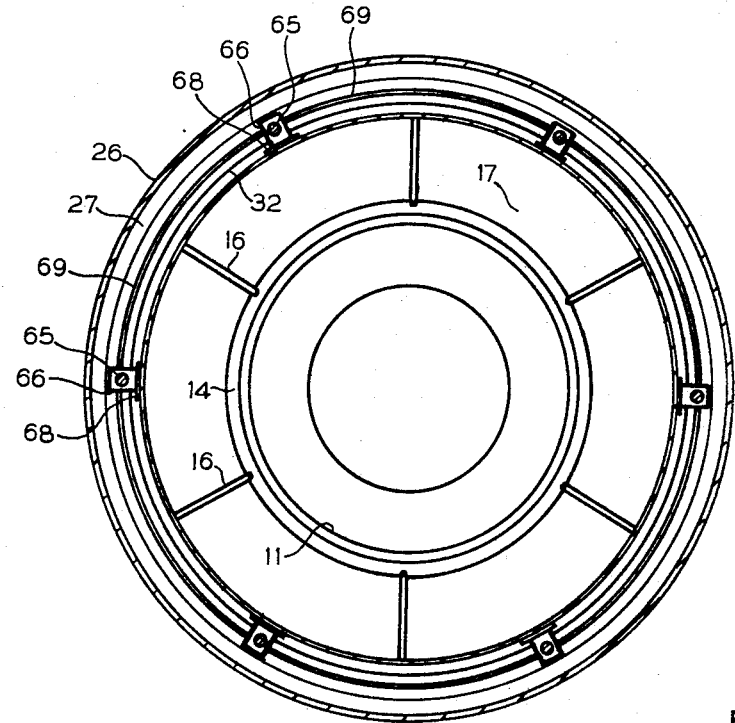
FIG. 7 is a sectional view as seen along the line 7—7 of FIG. 3.

Each right angle drive 66 is suitably secured as by attachment means 68 to cowl panel 24 and contains a suitable right angle drive mechanism such, for example, as the well-known arrangement of a pair of engaged bevel gears (not shown). As best seen in FIG. 7, right angle drives 66 are operatively coupled together for synchronous operation by means of flexible cables 69 which extend therebetween.

Drive shafts 65 have reduced diameter end portions 70 which are suitably journalled in the downstream cascade end ring 40 and comprise the input shafts to the associated right angle drives 46. It will be understood that right angle drives 46 and/or power hinges 42 have suitable gearing so that doors 39 are rotated to their extended deployed position, as shown in FIGS. 4 and 5, when drive shafts 65 have rotated a sufficient number of revolutions to advance nut members 61 and their associated aft cowl portion 22 to deployed position.

From the foregoing description of the parts and their manner of arrangement and interconnection, the operation of the reverser is deemed to be fully apparent. It will suffice therefore merely to point out that the actuator drive shafts 65, in the manner of cantilever beams supported by the forward cowl portion 21, provide the translational support for the aft cowl portion 22 as the same moves telescopically over and without sliding contact with the cascades 31 to expose, or to cover, the same. The associated nut members 61 in threaded engagement on the threaded portions 67 of the shafts provide this support and also cause the translational movement as the shafts are rotated synchronously by reason of the drive coupling therebetween. It will also be apparent that drive shafts 65 further function through their right angle drives 46, flexible shafts 45, and the power hinges 42 to rotate the blocker doors 39 between their stowed and deployed positions as the aft cowl portion is moved translationally between its comparable positions. It will be noted, however, that unlike most prior art reversers of this type, the blocker doors in the instant case provide these required blocker door functions without necessitating that the doors per se be translated, thereby providing a more simple and effective mechanism for the purpose.

With the doors in their deployed blocking position, the same meet along abutting side edges 71, FIG. 8, to block the bypass duct 17 and force the fan air through the cascades 31 and thence forwardly of the forward cowl portion 21.

It will further be apparent that in view of the nature of the screw drives, the aft cowl portion will hold a position to which it is moved translationally either by rotation of drive shafts 65 effected through operation of the actuators 60, or by movement of the doors 39 acting through their power hinges and the right angle drives 46. It will be additionally apparent that doors 39 are so mounted that once moved into the air stream in bypass duct 17, the forces acting thereon will move the same into deployed position, thus to provide a fail safe operating condition.

From the foregoing it will now be apparent that a thrust reverser arrangement has been provided which is well adapted to fulfill the aforestated objects of the invention and that while the invention has been described with reference to a preferred embodiment for purposes of illustration, it will be apparent that other forms of the invention are possible.

Having thus described the invention, what is claimed and desired to be secured by Letters Patent is:

1. A thrust reverser for a fan type jet propulsion engine having an inner wall and a fan concentric therewith and extended radially beyond said wall, comprising, a cowling surrounding said fan and spaced from said wall to form a bypass duct, said cowling being split into abutting forward and aft cowl portions forming inner and outer flow surfaces in cruise positions, a ring of flow reversing cascades disposed within said cowling and secured to said forward cowl portion, a plurality of peripherally disposed blocker doors pivoted to said ring of cascades and forming part of said inner flow surface when said aft cowl portion is in the cruise position thereof, and actuating means disposed within said cowling and controllably interconnecting said doors and aft cowl portion for translating said aft portion downstream to an extended position for uncovering said cascades and rotating said doors into extended blocking position in said duct during the translational movement of the aft portion to said extended downstream position thereof thereby substantially to open the flow areas through the cascades concurrently with the blocking of the flow area through said duct, said actuating means comprising a plurality of rotary actuators respectively having drive shafts and translatable members respectively movable on said shafts and secured to the aft cowl portion, and comprising a plurality of right angle drives driven respectively by said drive shafts and having a coupling for operatively coupling the same together to operate said shafts in synchronism.

2. A thrust reverser as in claim 1, said coupling between said right angle drives comprising flexible shafts arcuately extended and connected therebetween.

3. A thrust reverser for a fan type jet propulsion engine having an inner wall and a fan concentric therewith and extended radially beyond said wall, comprising, a cowling surrounding said fan and spaced from said wall to form a bypass duct, said cowling being split into abutting forward and aft cowl portions forming inner and outer flow surfaces in cruise position, a ring of flow reversing cascades disposed within said cowling and secured to said forward cowl portion, a plurality of peripherally disposed blocker doors pivoted to said ring of cascades and forming part of said inner flow surface when said aft cowl portion is in the cruise position thereof, and actuating means disposed within said cowling and controllably interconnecting said doors and aft cowl portion for translating said aft portion downstream to an extended position for uncovering said cascades and rotating said doors into extended blocking position in said duct during the translational movement of the aft portion to said extended downstream position thereof thereby substantially to open the flow areas through the cascades concurrently with the blocking of the flow area through said duct, said actuating means comprising a plurality of rotary actuators respectively having drive shafts and translatable members respectively movable on said shafts and secured to the aft cowl portion, said doors respectively having a plurality of power hinges for pivotally securing the same to said ring of cascades, and said drive shafts having a plurality of right angle drives operatively connected to said power hinges to rotate said doors as said aft cowl portion moves translationally.

4. A thrust reverser as in claim 3, there being one of said right angle drives for each pair of adjacently disposed doors and flexible shaft connections between said one of the right angle drives and the power hinges for its associated pair of doors.

5. A thrust reverser for a fan type jet propulsion engine having an inner wall and a fan concentric therewith and extended radially beyond said wall, comprising, a cowling surrounding said fan and spaced from said wall to form a bypass duct, said cowling being split into abutting forward and aft cowl portions forming inner and outer flow surfaces in cruise position, a ring of flow reversing cascades disposed within said cowling and secured to said forward cowl portion, a plurality of peripherally disposed blocker doors, a plurality of power hinges for respectively pivoting said doors to said ring of cascades, said doors forming part of said inner flow surface when said aft cowl portion is in the cruise position thereof, a plurality of synchronously operated rotary actuators disposed within said cowling and supported by said forward cowl portion, said actuators comprising threaded drive shafts extended through said cascades and respectively having translatable elements threadedly engaged thereon and secured to said aft cowl portion for translating the same downstream to an extended position uncovering said cascades, a plurality of right angle drives operatively connected respectively to said drive shafts, and flexible drive shaft connections between said right angle drives and said power hinges to rotate said doors into extended blocking position in said duct during the translational movement of the aft portion to said extended downstream position thereof thereby substantially to open the flow areas through the cascades concurrently with the blocking of the flow area through said duct.

6. A thrust reverser as in claim 5 and comprising a second set of right angle drives operatively connected to said drive shafts, and flexible drive connections operatively interconnecting said second set of right angle drives to synchronize the rotation of said drive shafts, thereby to render said rotary actuators synchronously operable to translate said aft cowl portion and to rotate said doors.

7. A thrust reverser as in claim 3, said cascades having a downstream end ring, said power hinges being secured to said end ring, said doors in cruise position being disposed under said cascades to close the same internally, adjacently disposed pairs of said doors meeting in abutting relationship at their side edges when the doors are rotated into said extended blocking position thereof, and cowl panel means for filling the gaps between said side edges of the doors when the same are in cruise position.

References Cited

UNITED STATES PATENTS

| 2,950,595 | 8/1960 | Laucher et al. | 239—265.31 |
| 3,036,431 | 5/1962 | Vdolek | 60—229 |
| 3,262,268 | 7/1966 | Beavers | 60—226 |
| 3,262,270 | 7/1966 | Beavers | 60—226 |

FOREIGN PATENTS

| 764,907 | 1/1957 | Great Britain. |

CARLTON R. CROYLE, Primary Examiner

A. D. HERRMANN, Assistant Examiner

U.S. Cl. X.R.

60—226; 239—265.29, 265.31